(12) United States Patent
Arakawa et al.

(10) Patent No.: US 8,780,444 B2
(45) Date of Patent: Jul. 15, 2014

(54) SCREEN AND PROJECTION SYSTEM

(75) Inventors: Osamu Arakawa, Shiojiri (JP);
Hiroyuki Shindo, Matsumoto (JP);
Toshiaki Hashizume, Okaya (JP);
Tatsuo Uchida, Sendai (JP); Yoshito Suzuki, Sayama (JP); Baku Katagiri, Warabi (JP)

(73) Assignees: Seiko Epson Corporation, Tokyo (JP);
Tohoku University, Sendai-shi (JP)

( * ) Notice: Subject to any disclaimer, the term of this patent is extended or adjusted under 35 U.S.C. 154(b) by 26 days.

(21) Appl. No.: 13/620,064

(22) Filed: Sep. 14, 2012

(65) Prior Publication Data
US 2013/0170028 A1 Jul. 4, 2013

(30) Foreign Application Priority Data

Oct. 17, 2011 (JP) ................................. 2011-227653

(51) Int. Cl.
*G03B 21/56* (2006.01)
(52) U.S. Cl.
USPC .......................................... 359/449; 359/459
(58) Field of Classification Search
USPC ................................. 359/449, 459
See application file for complete search history.

(56) References Cited

U.S. PATENT DOCUMENTS

| | | | | |
|---|---|---|---|---|
| 7,158,297 | B2 * | 1/2007 | Umeya ......................... | 359/443 |
| 7,349,154 | B2 * | 3/2008 | Aiura et al. ................... | 359/449 |
| 7,443,582 | B2 * | 10/2008 | Yamauchi .................... | 359/449 |
| 7,561,330 | B2 * | 7/2009 | Goto ............................. | 359/459 |

FOREIGN PATENT DOCUMENTS

| | | |
|---|---|---|
| JP | 02-051101 | 2/1990 |
| JP | 2004-069836 | 3/2004 |

* cited by examiner

*Primary Examiner* — Christopher Mahoney
(74) *Attorney, Agent, or Firm* — Workman Nydegger

(57) ABSTRACT

A screen in which observation distance may be adjusted while maintaining image brightness and a projection system using the screen. In a light control layer of a screen, a first angle region that determines a diffusion distribution of a reflected light is different according to the screen position in a control direction in which light diffusion control is performed. Accordingly, a diffusion distribution of image light emitted from a screen surface is adjusted to be tilted downward by an upper end and upward by a lower end according to the screen position. Thus, for example, a size of a diffused angle range is maintained to be 30°, and a direction in which the image light is diffusion-emitted corresponds to an assumed position of an observer. The projection image can be observed while maintaining brightness of an image and the observation distance L can be adjusted to be short.

21 Claims, 11 Drawing Sheets

SCREEN AND PROJECTION SYSTEM

TECHNICAL FIELD

The present invention relates to a screen for reflecting a projection light from an image projection apparatus such as a projector located on a front side of the screen and projecting the projection image, and a projection system using the screen.

BACKGROUND ART

As a screen for projecting a projection image by reflecting the projection light from, for example, a projector, a screen including a light control layer formed of a polymer membrane having a special structure having a light control function of scattering or diffusing and transmitting a light incident from an angle region within a predetermined range and straightly transmitting a light incident from an angle region outside the predetermined range is known (see Japanese Unexamined Patent Application, First Publication No. 2004-69836). Further, although it is not technology for a reflection-type screen, a screen for continuously changing an incident angle of a light to be scattered using a light control plate capable of controlling diffusion of the light and a method of manufacturing the same are known (see Japanese Unexamined Patent Application, First Publication No. H2-51101).

For example, in controlling an incident light from a projector incident on a screen using a light control layer such as that in Japanese Unexamined Patent Application, First Publication No. 2004-69836, the incident light is straightly transmitted through the light control layer and reflected at a desired angle at the time of incidence. At the time of emission after the reflection, the light is diffused and transmitted through the light control layer and controlled to have a diffusion distribution in a predetermined angle range. Accordingly, a brighter image can be projected while diffusing the light. Further, the light from the projector incident at a predetermined angle with respect to the screen can be directed in a direction in which an observer is present and an outer light incident at a different angle from the light from the projector can be directed in a direction in which the observer is not present by controlling a diffusion angle of the light control layer and an angle of the reflection layer, resulting in a high contrast of an image displayed on the screen. However, an area in which a bright high-contrast image can be observed is determined based on an angle with respect to the screen, as well as a distance from the screen (an observation distance). In the case of the screen such as the screen in Japanese Unexamined Patent Application, First Publication No. 2004-69836, since a diffusion range of the image light reflected by the screen is limited, for example, when an observer approaches the screen and reaches a position in the diffusion range of the image light emitted from a center side of the screen but outside a diffusion range of an image light emitted from a periphery side of the screen, an image on the periphery side rapidly becomes dark or invisible, unlike an image on the screen center side. Further, such a position is in an arrival range of the outer light reflected by the screen, resulting in low visibility of the image. For this reason, an increase of the diffusion range of the image light through the light control layer may be considered. However, as the diffusion range increases, the light control layer needs to have a structure in which more layers are stacked, resulting in a thick and heavy screen. Further, when a screen having a general mat characteristic is used without using the light control layer as described above, the diffusion area is widened and the above problems do not occur even when the observer approaches the screen to some extent. However, since the image light is diffused in a wide range, a dark image is provided to the observer.

Further, in Japanese Unexamined Patent Application, First Publication No. H2-51101, the technology of the light control plate to change an incidence angle of the light to be scattered is disclosed as described above, but an application of the light control plate to a screen for projecting a projection image from, for example, a projector by reflecting the projection light is not disclosed or suggested.

SUMMARY OF INVENTION

An object of the present invention is to provide a screen capable of adjusting an observation distance while maintaining brightness of an image and a projection system using the screen.

In order to achieve the above object, a screen of an aspect of the present invention includes (a) a substrate; (b) a light reflection layer including (b1) a to plurality of prism portions formed to be arranged on a main surface of the substrate and having a sectional serrulate shape in an arrangement direction, and (b2) a plurality of light reflection portions formed in surface portions of the plurality of prism portions, for reflecting an incident light; and (c) a light control layer formed on a surface of the light reflection layer, and in a function section that includes a predetermined control direction among directions parallel to the main surface of the substrate and is perpendicular to the main surface of the substrate, the light control layer allowing a light incident to pass on the light reflection layer and allowing a reflected light to diffuse from the light reflection layer, (d) the light control layer diffuses the reflected light so that a diffusion distribution of the reflected light differs according to a position in the predetermined control direction on the main surface of the substrate.

In the screen, the light control layer allows a diffusion distribution of a reflected light to be changed according to a position on the main surface of the substrate in a predetermined control direction in which light diffusion control is performed. Accordingly, since the diffusion distribution of an image light emitted from a screen surface can be adjusted according to the position on the screen by diffusing the reflected light, an observation distance can be adjusted while maintaining brightness of an image, for example, with a size of the diffused angle range being maintained and the direction corresponding to an assumed position of the observer.

In a concrete aspect of the present invention, the light control layer exhibits, in the function section corresponding to the predetermined control direction, a diffusion characteristic that diffuses the reflected light at a larger angle than the other section corresponding to the other direction, the light control layer diffuses and transmits a light incident from the first angle region in which a inclination with respect to the main surface of the substrate is in a predetermined range, and straightly transmits a light incident from a second angle region outside the predetermined range. In this case, a light transmission state is drastically changed into either diffusion to transmission or straight transmission according to a light incidence angle, thus efficiently controlling light transmission and diffusion.

In another aspect of the present invention, the light control layer allows the first angle region to be continuously changed according to the position in the predetermined control direction on the main surface of the substrate. In this case, the diffusion range is smoothly changed. Accordingly, it is possible to suppress a generation of a border of the range of the diffusion.

In another aspect of the present invention, the light control layer is configured in a plurality of partial areas divided according to the position in the predetermined control direction on the main surface of the substrate, has the first angle region that is the same in each partial area and different between partial areas, and allows the first angle region to be gradually changed. In this case, the plurality of partial areas are individually fabricated. Accordingly, it is possible to simplify a structure.

In another aspect of the present invention, the light control layer allows the first angle region to be changed so that a diffusion center axis that are centers of the first angle region in the function section corresponding to the predetermined control direction are directed to be narrow at an end side of an emission direction. In this case, an image light can be focused on an observer present in a specific direction.

In another aspect of the present invention, the light control layer changes the first angle region so that the diffusion center axis intersects at one point. In this case, the image light can be focused on an observer present in a specific narrower direction.

In another aspect of the present invention, in the light control layer, the predetermined control direction is parallel to a reference direction obtained by orthogonally projecting an optical path direction of a reference light that is a center light beam of an incident light to the main surface of the substrate. In this case, a control direction of the light control layer can correspond to, for example, a projection light from an image projection apparatus such as a projector, and display can be performed using the projection light efficiently.

In another aspect of the present invention, in the light control layer, the predetermined control direction is a perpendicular direction to a longitudinal direction of the substrate. In this case, for example, image projection can be performed through downward projection or upward projection with a vertical direction being used as the predetermined control direction in a landscape-oriented screen.

In order to achieve the above object, a projection system according to the present invention includes (a) any one of the above screens, and (b) an image projection apparatus for projecting an incident light that is a projection image to the screen in a predetermined angle range. This projection system projects a projection light from the image projection apparatus to the screen. Accordingly, it is possible to adjust an observation distance while maintaining brightness of an image.

DETAILED DESCRIPTION OF THE INVENTION

First Embodiment

Hereinafter, a screen according to a first embodiment of the present invention and a projection system including the screen will be described with reference to the accompanying drawings.

(A. Structure of Projection System)

Figure 1:
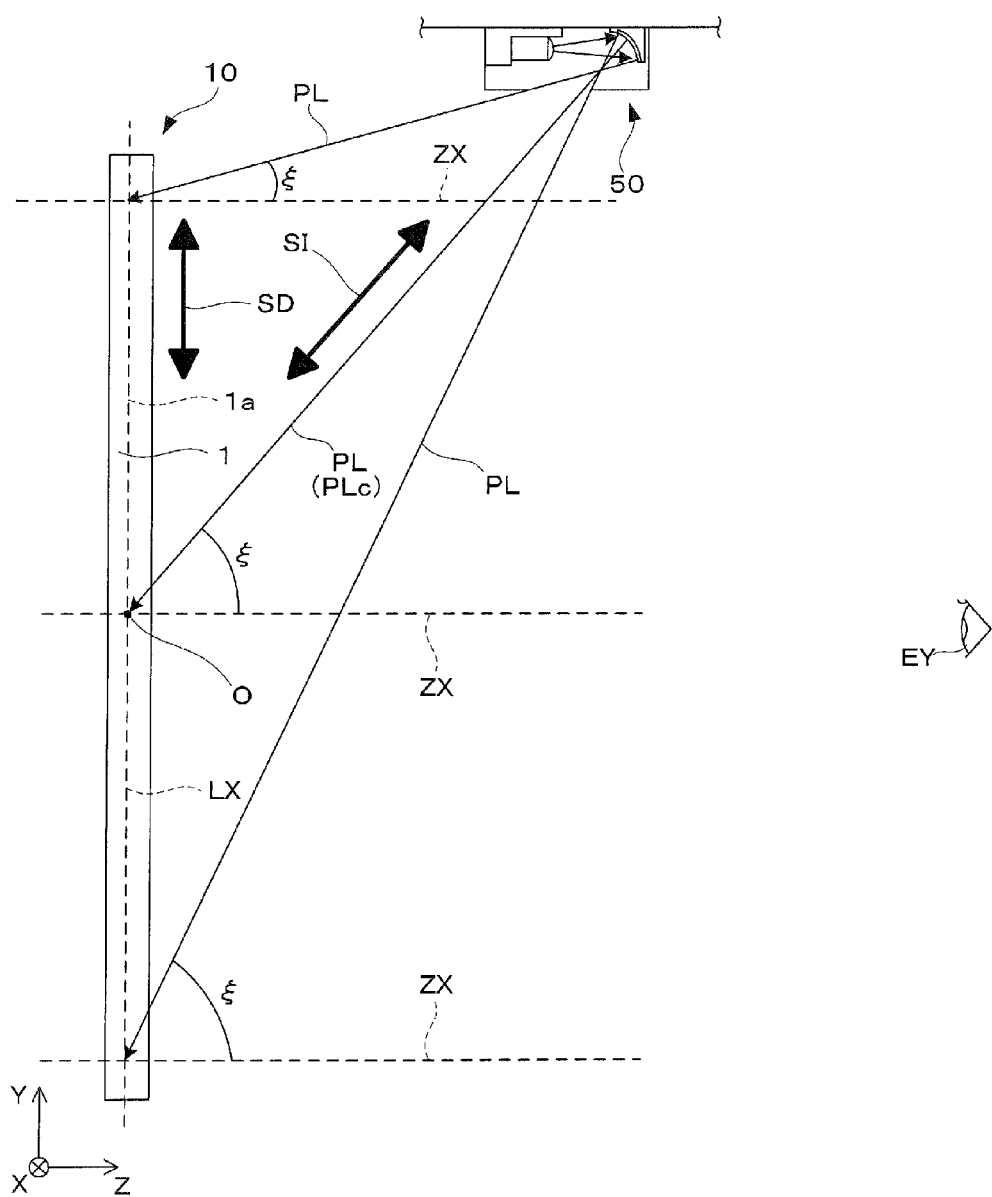
FIG. 1 is a view showing a screen and a projection system according to a first embodiment.

As shown in FIG. 1, a projection system 100 of the present embodiment includes a screen 10 and a projector 50.

The projector 50 is installed in proximity to the screen 10 in a state in which the projector 50 is suspended and supported by a ceiling of a room. That is, projection by the projector 50 is proximity projection from a top, that is, extreme oblique projection in a −Z direction biased in a −Y direction.

As shown in FIGS. 1 to 4, the screen 10 has a vertical rectangular shape in which a horizontal direction in FIG. 1, that is, an X direction, is a longitudinal direction and a vertical direction, that is, a Y direction, is a transverse direction.

The screen 10 is a reflection-type screen in which an incident light PL from the projector 50 installed on a front side, that is, on an approximately +Z side, is turned back and emitted as a reflected light toward the front side, that is, the approximately +Z side. More specifically, the incident light PL emitted obliquely downward from the projector 50 is projected to a main surface 1*a* parallel to an XY plane of the screen 10 and reflected toward the front side by a fine structure having a Fresnel shape provided on the main surface 1*a*, such that a projection image is provided to an observer EY on the approximately +Z side. Further, as shown, for example, in FIG. 1, since the projection is the proximity projection, an incidence angle ξ of the incident light PL is within a certain angle range. Further, in FIG. 1, a normal direction (the Z direction) of the main surface 1*a* is indicated by a normal ZX, and the incidence angle ξ of the incident light PL is defined as an angle with respect to the normal ZX.

Figure 3:
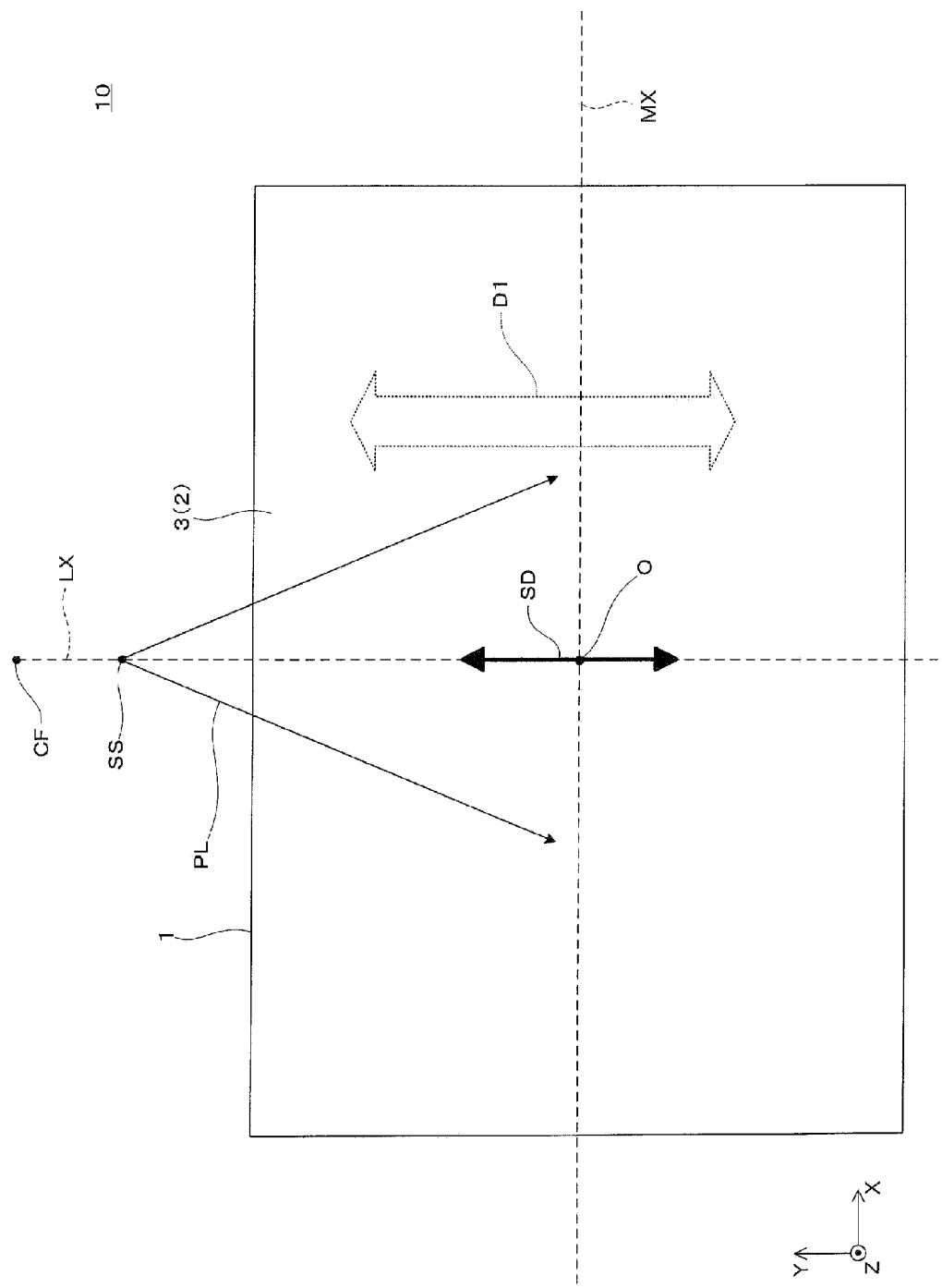
FIG. 3 is a view illustrating a light control layer of the screen.
Figure 4:
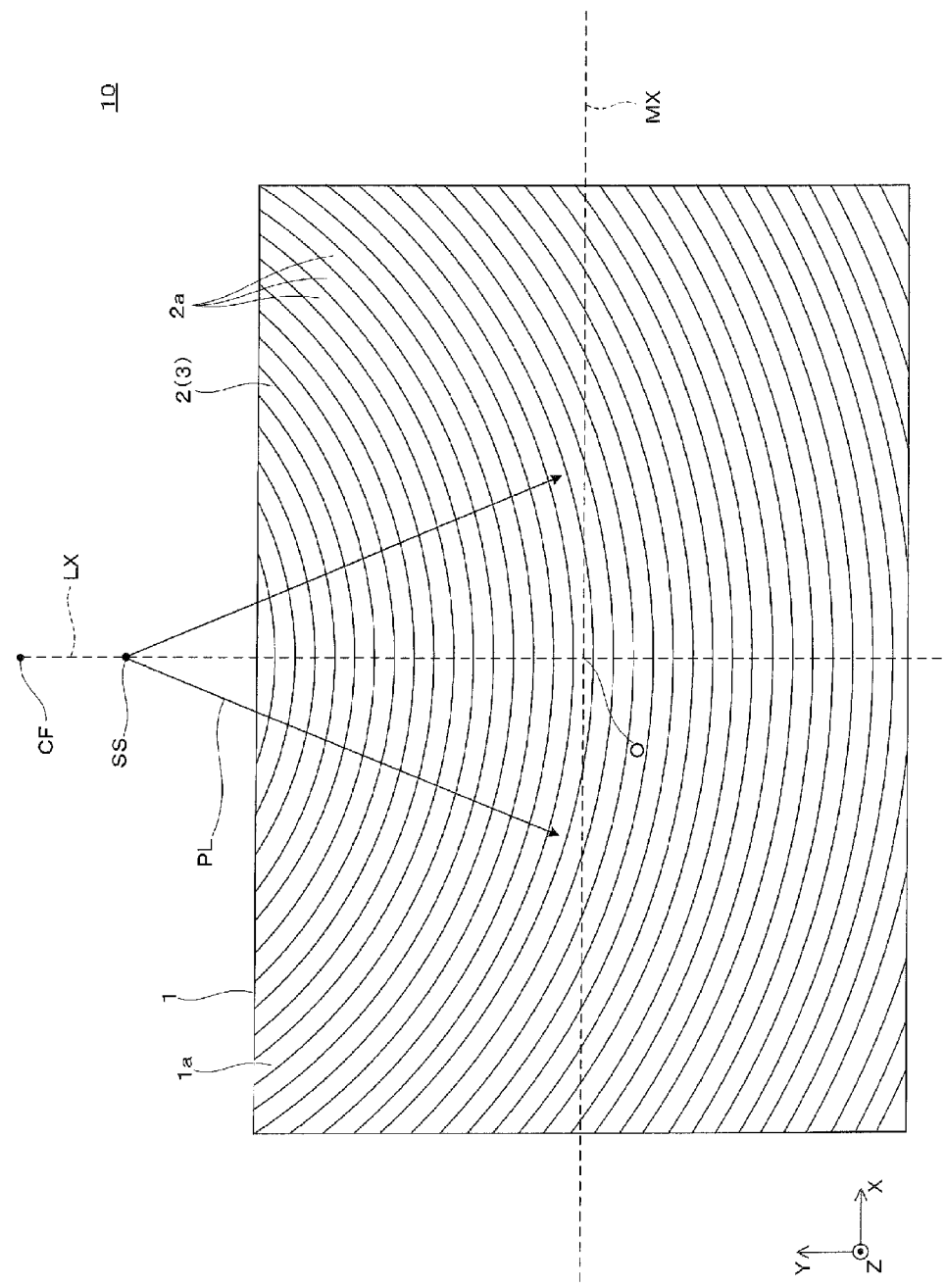
FIG. 4 is a view illustrating a light reflection layer of the screen.

As shown in FIGS. 3 and 4, the incident light PL to the screen 10, which is a projection light from the projector 50, is projected in a state in which the incident light PL is symmetrical in the X direction using a center axis LX that is a center line, which extends in the Y direction from a projection point SS of the projector 50 via a center of the main surface 1*a* of the screen 10 and symmetrically divides the screen 10 in two, as a reference. In other words, the projection point SS of the incident light PL is in a position in which a perpendicular line from a lens of the projector 50 to the main surface 1*a* intersects the center axis LX, and the incident light PL is incident from a specific angle range according to a projection range of the screen 10 on the basis of a screen center point O on the center axis LX of the screen 10. Further, the screen center point O is a point on the main surface 1*a* and is an intersection between the center axis LX extending in the Y direction and an axis MX extending in the X direction. That is, the screen center point O is a central portion of the substrate 1.

Here, as shown in FIG. 1, a component directed to the screen center point O in the incident light PL incident from the angle range is a reference light PLc, an optical path direction of this reference light PLc is a reference incidence direction SI, and a direction obtained by orthogonally projecting the reference incidence direction SI to the main surface 1a of the substrate 1 is a reference direction SD, which is a reference of an incidence direction of the incident light PL on the screen 10. In this case, the reference direction SD corresponds to the projection point SS, which is a reference point of the light source for the incident light PL, is parallel to the main surface 1a, and particularly, is a direction parallel to the center axis LX, that is, the Y direction. Further, since the projection by the projector 50 is the proximity projection from the top, a size of the incidence angle ξ of the incident light PL incident from the projector 50 to each point of the screen 10 decreases on the upward side of the screen 10, that is, on the light source side of the projector 50.

(B. Structure of Screen)

Figure 2:
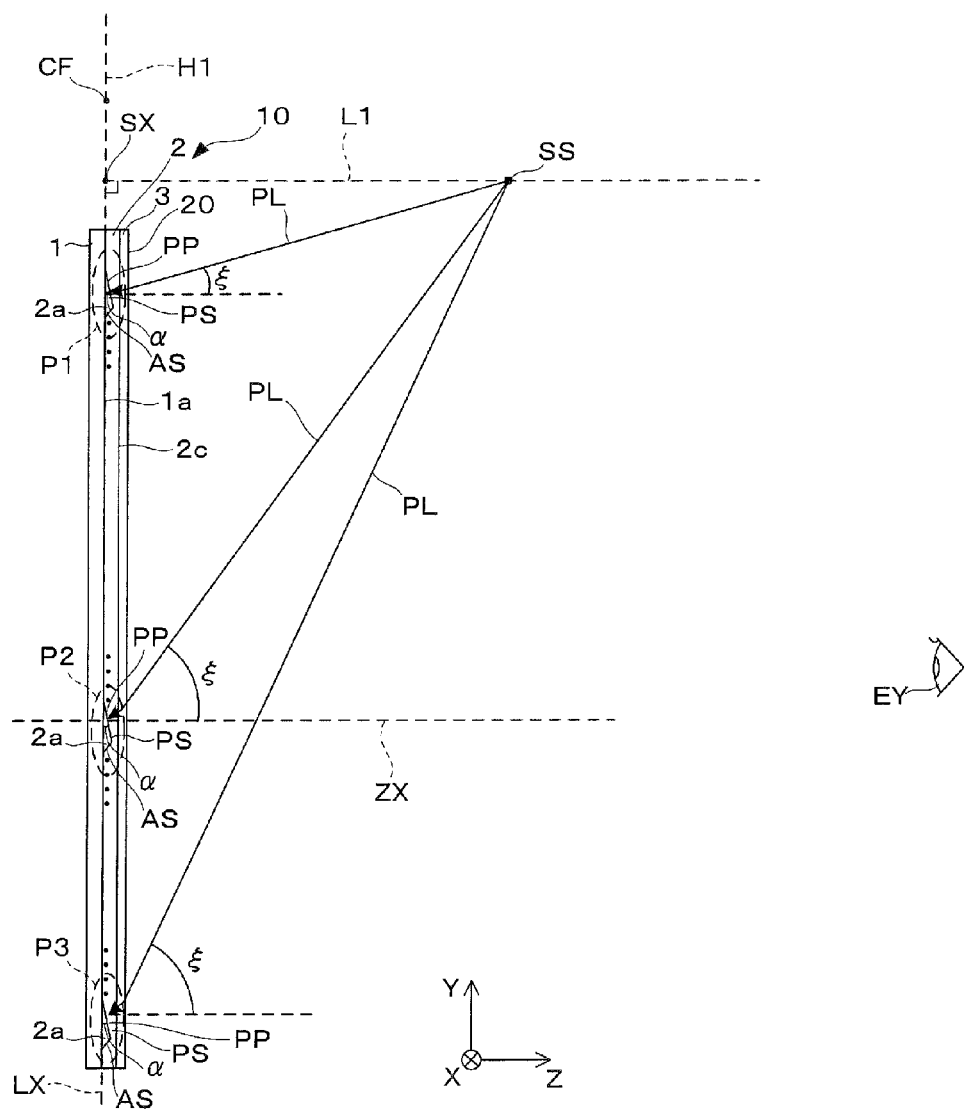
FIG. 2 is a cross-sectional view illustrating a structure of the screen.

Hereinafter, a structure of the screen 10 will be described in detail with reference to, for example, FIG. 2. First, as shown in FIGS. 2 to 4, the screen 10 includes a sheet-shaped substrate 1 forming an appearance of the vertical rectangular shape. Further, as shown in FIG. 2, the screen 10 includes a light reflection layer 2 formed on a surface of the substrate 1, a light control layer 3 formed on a surface of the light reflection layer 2, and a protection layer 20 that covers a surface of the light control layer 3.

The substrate 1 has the main surface 1a that is a reference surface of the screen 10 as a surface on the +Z side. This main surface 1a is parallel to the XY plane and is a display plane that is a reference of incidence or reflection of the incident light PL directed to the screen 10. Further, the substrate 1 is formed of, for example, resin material having the property of a light-absorbing and has flexibility.

The light reflection layer 2 includes a plurality of prism portions 2a formed on the main surface 1a of the substrate 1, a plurality of light reflection portions PP formed on surface portions of the plurality of prism portions 2a, a light absorption portion AS for absorbing the incident light, and a leveling layer 2b for protecting the portions and forming a surface 2c of the light reflection layer 2. The surface 2c of the light reflection layer 2 is a surface parallel to the main surface 1a as the display plane parallel to the XY plane.

The plurality of prism portions 2a form a Fresnel shape without a gap arranged in a concentric arc shape, as shown in, for example, FIG. 4. Here, as shown in FIG. 2, a center CF of the concentric arc shape is on a plane H1 extending from the main surface 1a and is set on the center axis LX that is the center line of the screen 10 to correspond to the projection point SS of the incident light PL. That is, when an intersection between a line L1 vertically drawn from the projection point SS to the main surface 1a, which is the display plane, and the plane H1 is an intersection SX, the center CF and the intersection SX are both arranged on the center axis LX.

Figure 5:
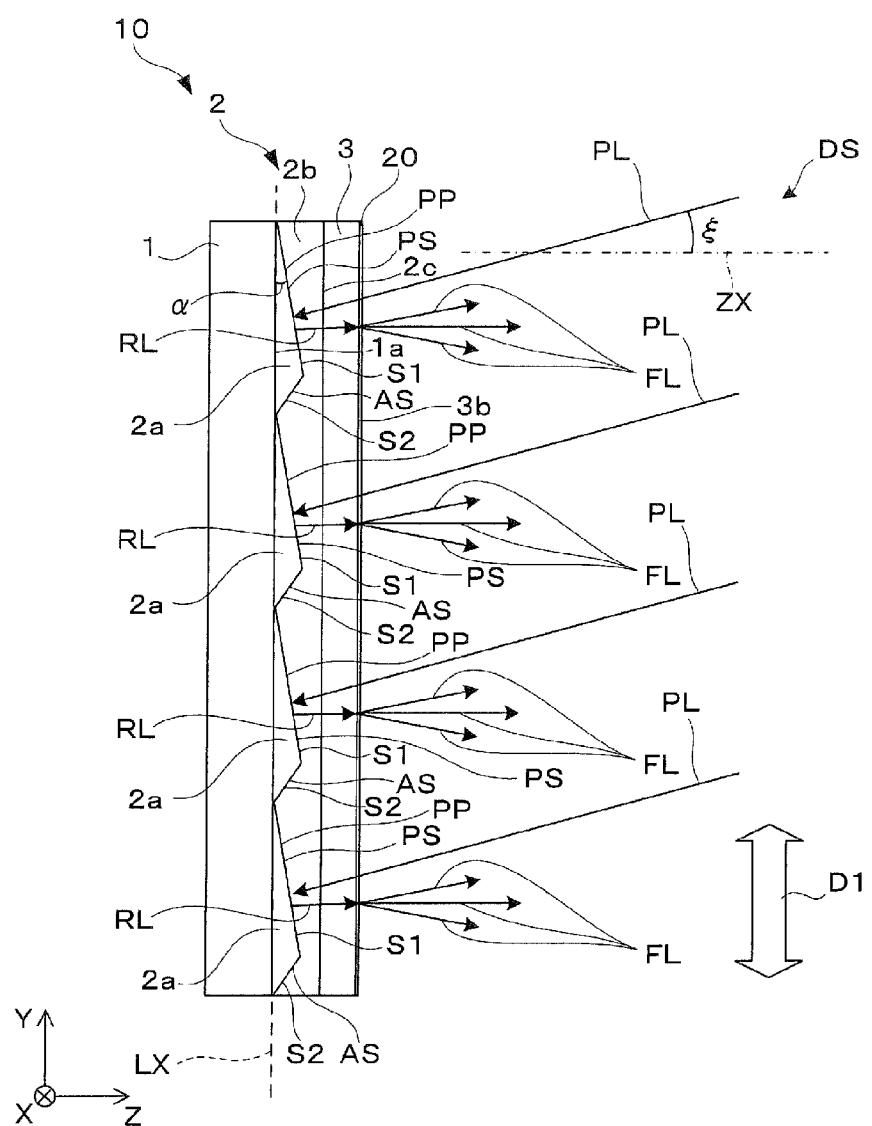
FIG. 5 is a view illustrating an overview of an operation of the screen.

Further, for example, a surface portion of each prism portion 2a arranged without a gap in a section of a central portion of the screen 10 shown in FIG. 5 in the light reflection layer 2 includes a first inclined surface S1 that is a surface inclined upward from the main surface 1a, that is, in a +Y direction, and a second inclined surface S2 that is a surface inclined downward from the main surface 1a, that is, in a −Y direction. As the respective prism portions 2a are continuous, the respective inclined surfaces S1 and S2 are alternately arranged. Accordingly, the plurality of prism portions 2a are in a sectional serrulate shape as a whole from an upper end to a lower end in the Y direction that is an arrangement direction in the central portion of the screen 10. Further, since the prism portions 2a are arranged in a concentric arc shape with the center CF being used as a reference, the other section passing through the center CF has the same shape. That is, the plurality of prism portions 2a are in the sectional serrulate shape over the entire screen 10. A reflective film is provided on the first inclined surface S1 among the two inclined surfaces S1 and S2 by aluminum deposition to form a light reflection portion PP. Further, the light absorption portion AS that is the second inclined surface S2 allows an incident unnecessary light to be passed to the substrate 1. The unnecessary light passing through the light absorption portion AS is absorbed by the substrate 1. Accordingly, contrast degradation of the screen 10 can be suppressed. The light absorption portion AS may be formed, for example, by coating a black paint. In this case, the incident unnecessary light can be absorbed by the light absorption portion AS. In addition, for example, each prism portion 2a and the substrate 1 may be formed of an to optically transparent resin and a back surface of substrate 1 may be coated with a black paint.

The light control layer 3 is formed on the surface 2c of the leveling layer 2b. The light control layer 3 is formed by combining a special polymer membrane and a transparent plastic material, and has an internal, specific regular structure in a diffraction grating shape of the polymer membrane and the transparent plastic material. With this structure, the light control layer 3 has an optical characteristic that the light control layer 3 drastically changes a light transmission state into either diffusion-transmission or straight transmission according to an incident angle of the light in a section that includes a predetermined direction among directions parallel to the main surface 1a of the substrate 1 and is orthogonal to the main surface of the substrate (see Patent Document 1 for details). Here, as described above, a predetermined direction that is a light control reference in the light control layer 3 is referred to as a control direction. In the case of the present embodiment, as shown in FIG. 5, the control direction D1 is assumed to be parallel to the reference direction SD, that is, to be along the Y direction. The light control layer 3 has incidence angle selectivity as described above as an optical characteristic. Accordingly, the light control layer 3 diffuses and transmits an incident light whose incidence angle is within a defined range in the control direction D1 and straightly transmits an incident light whose incidence angle is outside the defined range in the control direction D1. Further, a size of an angle that is a boundary related to whether the light control layer 3 diffusion-transmits or straightly transmits the light, that is, a width of the diffusion range, is constant (e.g., 30°), but for a setting of the direction, that is, the constant angle range, the elevation angle and the depression angle are continuously changed, with the direction of the normal ZX being 0°, according to a position in the control direction D1. Specifically, for example, in the center of the screen 10, the angle range is equally set in the control direction D1, that is, the Y direction. That is, the elevation angle is 15° and the depression angle is 15°, in which the direction of the normal ZX is 0°. On the other hand, on the +Y side (the upper end side) of the screen 10, the angle range is set so that the elevation angle is 0° and the depression angle is 30°. On the −Y side (the lower end side), the angle range is set so that the elevation angle is 30° and the depression angle is 0°. In a middle of the screen 10, the angle range is continuously changed. Further, details of manufacture of the light control layer 3 having such a structure are disclosed in Patent Document 2, but a desired structure can be manufactured by changing a radiation direction when radiating a light for forming the regular structure constituting the light control layer 3. Further, in the light control layer 3, the surface side, that is, the surface 3b on the +Z side, is a surface parallel to the main surface 1a that is the display plane.

The protection layer 20 is formed on the surface 3b of the light control layer 3, that is, on the +Z side, to protect the light reflection layer 2 and the light control layer 3 constituting a primary part of the screen 10. Further, when the protection layer 20 is unnecessary and omitted, the surface 3b becomes an outermost surface of the screen 10.

(C. Operation for Incident Light on Screen)

Hereinafter, an overview of an operation for the incident light PL on the screen 10 will be described with reference to FIG. 5. FIG. 5 shows a cross-section taken along the center axis LX, which is a function section DS, showing a reflection and diffusion function of the screen 10. That is, the function section DS is a surface that is parallel to a YZ plane, includes the control direction D1, and is orthogonal to the main surface 1a of the screen 10. In this case, the light control layer 3 exhibits, in the function section DS corresponding to the control direction D1, a diffusion characteristic that the light is diffused at a larger angle as compared to the other section corresponding to the other direction, that is, a drastic change as described above.

First, in a position on the center axis LX of the screen 10, the incident light PL incident at a specific incidence angle ξ with respect to the normal ZX from the +Y side passes through the protection layer 20, and is straightly transmitted through the light control layer 3 without being diffused to be an incident light at an angle outside a defined range. Next, the incident light PL is incident on the reflection surface PS of the light reflection layer 2. Here, the reflection surface PS is inclined by a small inclination angle α with respect to the main surface 1a toward the +Y side. Accordingly, the incident light PL becomes a reflected light RL whose incidence angle with respect to the Y direction has been changed and is turned back toward the light control layer 3. This reflected light RL is incident on the light control layer 3 at a different incidence angle from the incident light PL on a path. Here, the inclination angle α of the reflection surface PS has, for example, a different value between the area P1 on the +Y side shown in FIG. 2, the area P2 on a center side, and the area P3 on the −Y side. That is, the inclination angle α corresponds to the incidence angle of the incident light PL, as well as a structure of the light control layer 3, and is changed in the Y direction, that is, in the control direction D1. Accordingly, the reflected light RL is diffusion-transmitted through the light control layer 3 as a light incident at an angle in the desired range. That is, as shown in FIG. 5, the reflected light RL becomes a moderately diffused projection image light FL and is emitted toward the +Z side from the screen 10.

Figure 6:
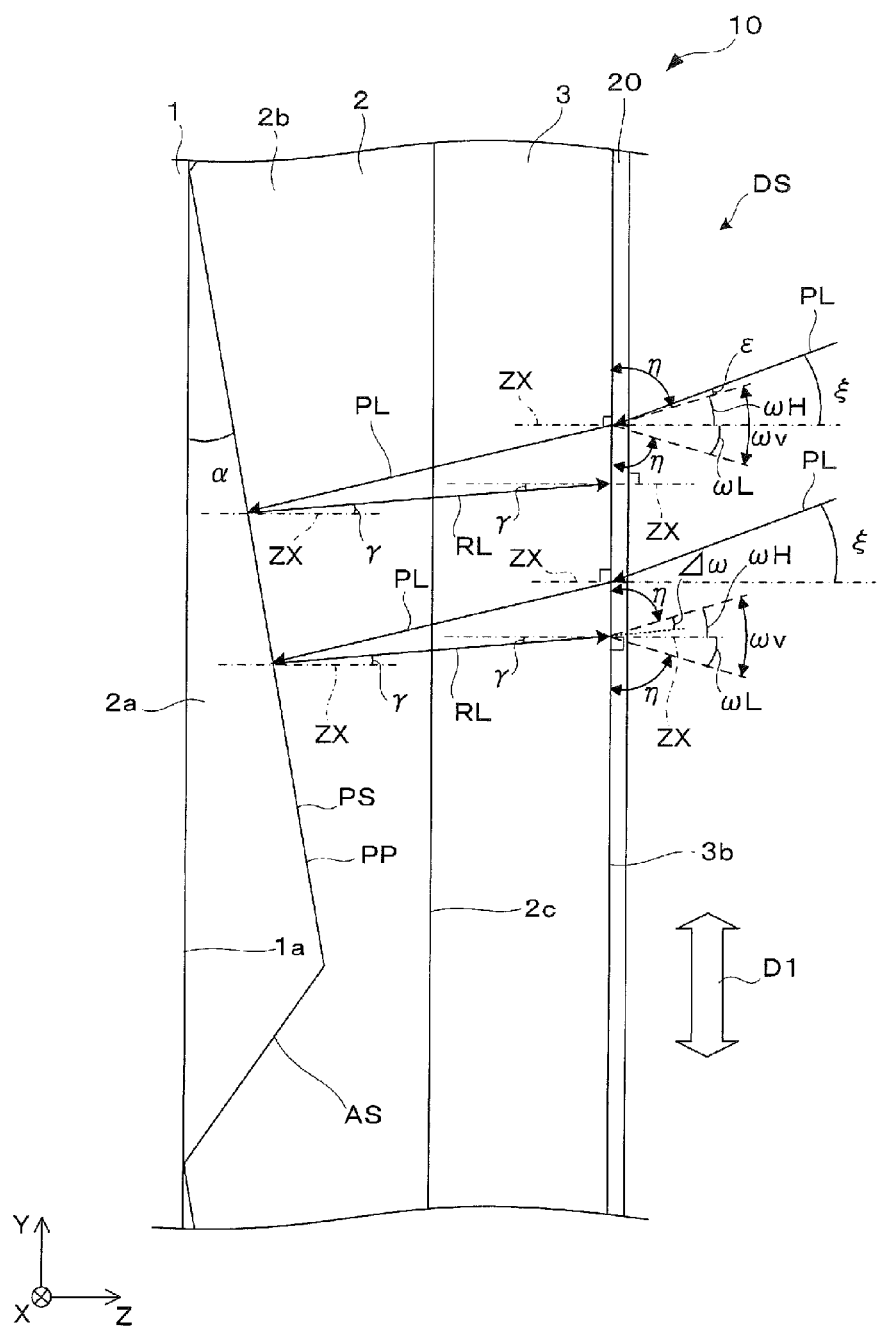
FIG. 6 is a partial enlarged view illustrating diffusion of a projection light by a screen.

Hereinafter, the above operation will be described in connection with the light control layer 3 of the screen 10 in greater detail with reference to, for example, FIG. 6. Here, FIG. 6 is an enlarged view of a part of a section in a control direction D1 in a central portion of the screen 10.

First, the light control layer 3 includes a film having a nature of diffusion-transmitting the light incident from the first angle region ωv as a light incident at an angle within a defined range and straightly transmits a light incident from the second angle region η that is in the other range. That is, the first angle region ωv indicates an angle range in which a light is diffused. Here, the first angle region ωv is, for example, in an angle range of about 30° in a control direction D1 with the direction of the normal ZX being a reference incidence angle 0°, and includes a region of an elevation angle that is upward from the normal Z, that is, an angle ωH on the +Y side and an area of a depression angle that is downward from the normal Z, that is, an angle ωL on the −Y side, with the normal ZX interposed therebetween. That is, the size of the angle ωH indicates a critical angle that is a diffusion-transmission range on the upper side, and the size of the angle ωL indicates a critical angle that is a diffusion-transmission range on the lower side. Further, FIG. 6 shows a central portion of the screen 10, in which the direction of the normal ZX is an incidence angle 0° that is a reference, the angle ωH is a positive angle, the angle ωL is a negative angle, and absolute values of the angles, that is, sizes of the angle ωH and the angle ωL, are the same or substantially the same. That is, the sizes of the angles ωH and ωL are both about 15°. Further, although this will be described later in detail, the angle ωH and the angle ωL are changed toward the periphery of the screen 10 while maintaining the size of the first angle region ωv, which is a sum of the angle ωH and the angle ωL, as about 30°.

In the light control layer 3 as described above, a determination is made as to whether the incident light PL at the incidence angle ξ is to be straightly transmitted or diffusion-transmitted according to whether the critical angles ωH and ωL are large or not. Here, as shown in FIG. 6, the incidence angle ξ is adjusted to be greater by an angle ε than the critical angle ωH in the first angle region ωv. That is, the incidence angle ξ is an angle outside the first angle region ωv and included in a second angle region η by the angle ε. Accordingly, the incident light PL at the time of incidence is straightly transmitted through the light control layer 3 without being diffused and is directed to the light reflection layer 2. In this case, since the incident light PL is not diffused after passing through the light control layer 3, the light is incident on the light reflection layer 2 without spread of the angle distribution, although the angle may be changed due to refraction. Accordingly, a reflection angle of the incident light PL on the reflection surface PS is relatively exact as designed. The incident light PL passing through the light control layer 3 is turned on the reflection surface PS of the light reflection layer 2 by the reflection surface PS and turned back to the light control layer 3 back. In this case, the reflection surface PS is inclined by the inclination angle α with respect to the display plane. As the inclination angle α is appropriately adjusted, a reflected light RL that is a component obtained by turning the incident light PL back is tilted by a small angle γ in a clockwise direction with respect to the normal ZX, that is, the +Z direction, and incident on the light control layer 3. This angle γ is smaller by a margin angle Δω than the critical angle ωH through adjustment of the inclination angle α. That is, the angle γ that is an angle of incidence of the reflected light RL on the light control layer 3 is within the range of the first angle region ωv by the margin angle Δω, such that the reflected light RL is reliably diffused and transmitted at the time of being transmitted through the light control layer 3 and emitted to the front side. The operation as described above is performed on all incident lights PL incident on the screen 10. For example, as shown in FIG. 5, the projection image light FL is moderately diffused and emitted. Further, while the central portion of the screen 10 shown in FIG. 6 has been described above, the inclination angle α is appropriately adjusted even in a periphery portion on the +Y side or the −Y side from the central portion so that the angle γ, which is the angle of incidence of the reflected light RL on the light control layer 3, is within the range of the first angle region ωv by the margin angle Δω.

Here, a minimum value of a value of the margin angle Δω is preferably 5° or more. That is, the angle of incidence of the reflected light RL on the light control layer 3 has a difference of 5° or more with an upper limit of the first angle region ωv, and this sufficient margin in the first angle region ωv provides reliable diffusion at the time of passage of the light control layer 3 from the outside. Further, this is an example, and a sufficient value of the margin angle Δω is not limited thereto, but may be appropriately determined according to a material, a structure or the like used as the light control layer 3. Further, the incidence angle ξ at the time of incidence is larger by the angle ε than the critical angle ωH of the first angle region ωv, but the angle ε is, for example, 5° or more, which provides a sufficient margin for reliable straight transmission.

(D. Change in Diffusion Distribution of Reflected Light for Control Direction of Light Control Layer)

As described above, in the present screen 10, the incident light PL is reflected to obtain the reflected light RL and this reflected light RL is moderately diffused as the projection image light FL and emitted, such that an image is recognized. For this reason, the diffusion distribution of the reflected light RL is determined, that is, an angle range in which light is diffused, which is determined by the first angle region ωv, is determined Accordingly, an observation range for observation in the screen 10 is determined.

Figure 7A:
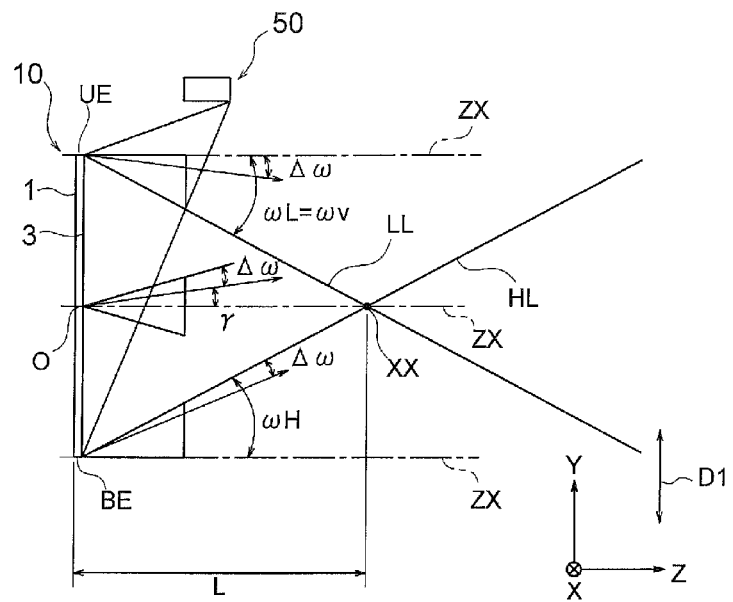
FIG. 7A is a view illustrating an operation of the light control layer

In particular, in the present embodiment, a direction of the first angle region ωv is changed according to the position of the screen 10 in the control direction D1, that is, in the Y direction, as illustrated in FIG. 7A. That is, as described with reference to FIG. 6, a ratio of the critical angle ωH of the elevation angle and the critical angle ωL of the depression angle is changed while maintaining the size of the first angle region am Accordingly, the observation range in the screen 10 becomes wider. More specifically, as shown in FIG. 7A, first, a size or a range of the diffusion of the first angle region ωv in the light control layer 3 is 30° irrespective of the position of the screen 10. Further, the critical angle ωH that is the region of the elevation angle and the critical angle ωL that is the region of the depression angle in the first angle region ωv are both 15° in the center O that is a center side of the screen 10, and the angle is equally divided. On the other hand, on an upper end UE side, that is, the +Y side, of the screen 10, the critical angle ωL in the first angle region ωv is 30° and the critical angle ωH is 0°. That is, the first angle region ωv is tilted to be the same as the critical angle ωL.

Meanwhile, on a lower end BE side, that is, the −Y side, of the screen 10, the critical angle ωL in the first angle region ωv is 0° and the critical angle ωH is 30°. That is, the first angle region ωv is tilted to be the same as the critical angle ωH. Further, at the above center O in the light control layer 3 and a middle position between the upper end UE and the lower end BE, a inclination of the first angle region ωv is continuously changed in the control direction D1. That is, the critical angle ωL gradually increases and the critical angle ωH decreases toward the upper end UE from the center O. Conversely, the critical angle ωL gradually decreases and the critical angle ωH increases toward the lower end BE from the center O. Further, in this case, in the light reflection layer 2 shown in, for example, FIG. 2, inclination angles α of the plurality of reflection surfaces PS are adjusted according to an internal structure of such a light control layer 3. That is, in FIG. 7A, the angle γ is appropriately adjusted. With the structure described above, in the screen 10, an upper image is diffused downward and a lower image is diffused upward, resulting in a wide range in which the screen image can be uniformly recognized. Conversely, an area in which the screen image cannot be uniformly recognized decreases.

Figure 7B:
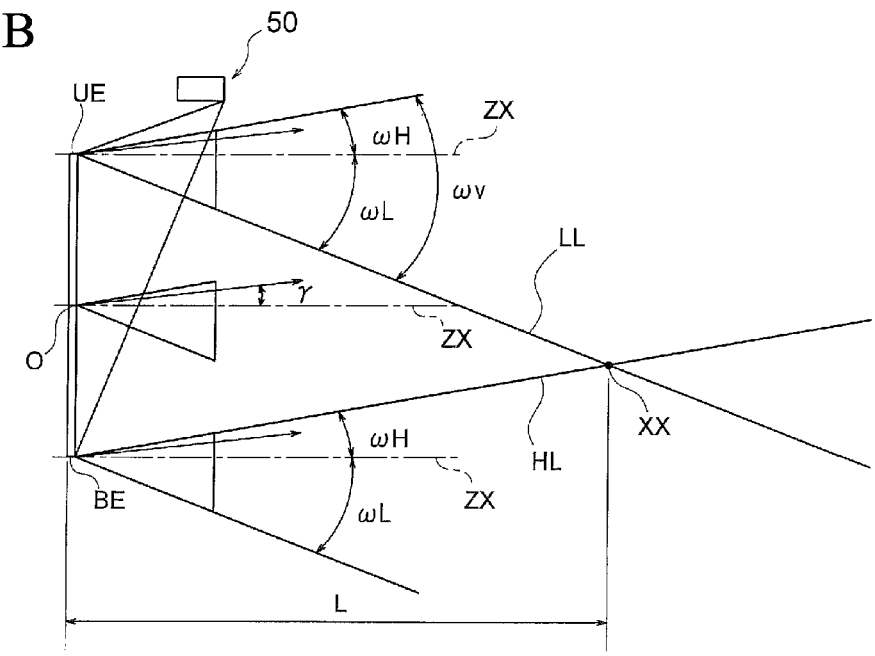
FIG. 7B is a view of a comparative example.

For example, in the case of a comparative example shown in FIG. 7B in which a direction of the first angle region ωv is unchanged and constant, an area in which an image light emitted from the upper end UE side or the lower end BE side that is the periphery of the screen 10 cannot be observed is widened as compared to the case shown in FIG. 7A. Specifically, when, for example, downward critical lines LL obtained by extending a lower end side of the critical angle ωL indicating a diffusion limit downward from the upper end UE are compared between FIGS. 7(A) and 7(B), the downward critical line LL in FIG. 7A in which the first angle region ωv is directed downward is at a larger angle downward than that in FIG. 7B in which there is no change in the first angle region ωv. Further, when upward critical lines HL obtained by extending upper end side of the critical angle ωH indicating a diffusion limit directed upward from the lower end BE are compared, the case of FIG. 7A in which the first angle region ωv is directed to an upper side is at a larger angle upward than the case of FIG. 7B in which there is no change in the first angle region ωv. In this case, since an area on the +Y side from the downward critical line LL indicates a limit area in which the upper end UE can be viewed, and an area on the −Y side from the upward critical line HL indicates a limit area in which the lower end BE can be viewed, when a point at which the respective critical lines LL and HL are connected is an intersection XX, an observation distance L from the intersection XX to the screen 10 indicates a limit point in which the overall screen 10 can be observed. In this case, it can be seen from the above that the observation distance L in FIG. 7A is shorter from the comparison between FIGS. 7A and 7B. That is, the observation range can be closer to the screen 10.

Further, in the case of downward proximity projection, for example, as shown in FIG. 2, the value of the incidence angle ξ decreases on the +Y side, that is, the projection point SS side, and it is difficult for the light to be straightly transmitted through the light control layer 3. On the other hand, in the screen 10 of the present embodiment, the first angle region ωv is directed and biased to the −Y side on the side of projection point SS. Thus, a sufficient value of the angle ε (see FIG. 6) can be secured in any position of the screen 10 and the incident light can be straightly transmitted reliably.

EXAMPLE 1

Figure 8A:
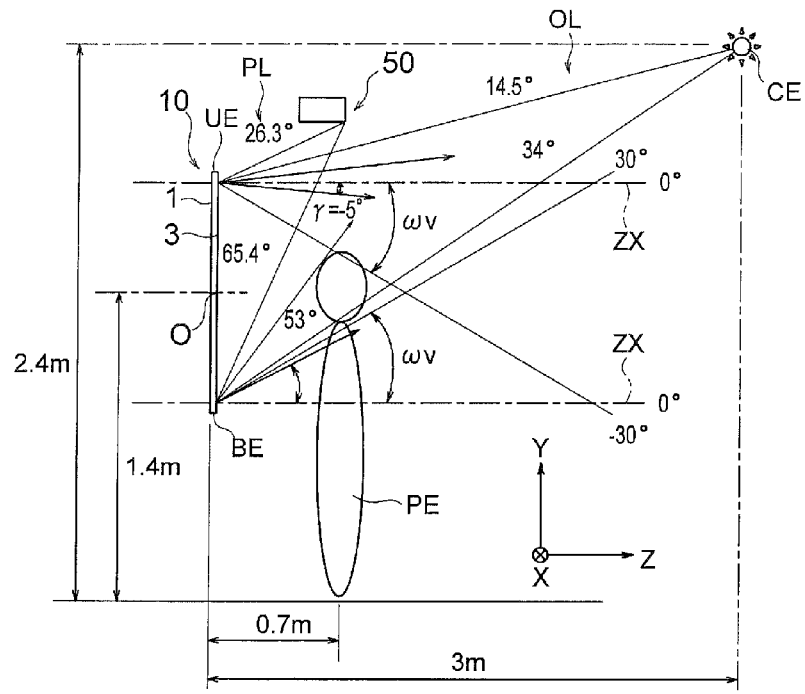
FIG. 8A is a view showing an example of an operation of the screen.
Figure 8B:
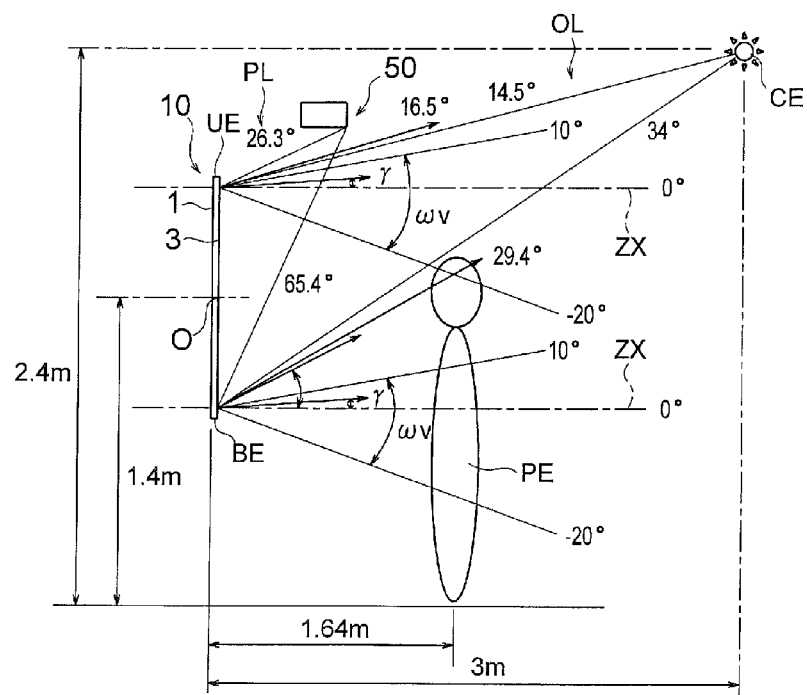
FIG. 8B is a view showing an example of an operation of a screen of a comparative example.

Hereinafter, an example of the present embodiment will be described with reference to, for example, FIG. 8(A). Here, FIG. 8(A) is an example corresponding to FIG. 7A. Further, FIG. 8B is an example corresponding to the comparative example of the FIG. 7B. As shown in FIG. 8(A), a screen 10 is arranged in a position in which a center point O of the screen 10 is at a distance of 1.4 m in a vertical direction (a Y direction) from the ground. Further, the incidence angle of the incident light PL from the projector 50 is 26.3° on the upper end UE side and 65.4° on the lower end BE side with respect to the normal ZX, that is, an angle 0°. Further, as described above, in the light control layer 3, the size of the first angle region ωv is 30°, the critical angle ωL is 30° and the critical angle ωH is 0° on the upper end UE side, and the critical angle ωL is 0° and the critical angle ωH is 30° on the lower end BE side. Further, it is assumed that the critical angle ωL is continuously changed to gradually increase toward the upper end UE from the center point O, and the critical angle ωH is continuously changed to gradually increase toward the lower end BE from the center point O. In this case, the observation distance L from the screen 10 to the intersection XX is 1.4 m. Meanwhile, in the example of FIG. 8B, a design is the same as the screen 10 in FIG. 8A except that the screen 10 has the same structure as the comparative example of the FIG. 7B. In this case, the observation distance L is 5.23 m.

Further, in the example of FIG. 8A, the value of the angle γ with respect to the normal ZX is −5° on the upper end UE side and 25° on the lower end BE side when the inclination angle α is appropriately adjusted (see, for example, FIG. 2).

That is, the value of the margin angle Δω (see FIG. 6) is a minimum value of 5°. Accordingly, separation of an outer light OL that is an unnecessary light is improved. Specifically, for example, when it is assumed that there is ceiling lighting CE that is a light source for the outer light OL in a position of 2.4 m in a vertical direction (a Y direction) from the ground and 3.0 m in a horizontal direction (a Z direction) from the screen 10 as shown FIG. 8A, the incidence angle of the outer light OL is 14.5° on the upper end UE side and 34° on the lower end BE side. On the other hand, as the angle γ is set (that is, the inclination angle α shown in, for example, FIG. 2 is adjusted) as described above, a reflection angle of the outer light OL is 6.3° on the upper end UE side and 53° on the lower end BE side. In this case, a reflected component of the outer light OL incident on the upper end UE is not directed to an observer PE. Further, it is difficult for a reflected component of the outer light OL incident on the lower end BE relatively easily directed to the observer PE to reach the observer PE. Specifically, as shown FIG. 8A, for example, when a height of a center point O located 1.4 m from the ground is a reference height position of the observer PE, the observer PE can be close to a distance of 0.7 m from the screen 10 without receiving the reflected component of the outer light OL. On the other hand, in the example shown in FIG. 8B, since the first angle region ωv is constant, the angle γ also is always constant irrespective of the position. Further, in the case shown in FIG. 8B, always, the critical angle ωL is 20°, the critical angle ωH is 10°, and the angle γ is set to 5° with a margin angle of 5° irrespective of whether the position is the upper end UE or the lower end BE. In this case, when there is the same ceiling lighting CE as that in the example of FIG. 8A and if the observer PE is close to less than a distance of 1.64 m from the screen 10, the observer PE receives a reflected component of the outer light OL incident on the lower end BE.

As described above, in the present embodiment, an area exhibiting a phenomenon in which the reflected light of the outer light OL that is an unnecessary light lands directly on the eyes of the observer PE can be adjusted to be narrow.

A type of screen capable of inclination projection from a ceiling of a room, that is, a top as in the above projection system 100, is suitable for an aspect of use in which a speaker, such as a presenter, standing in a position close to the screen 10 makes an explanation, since a person or an object does not shield the projection light at the time of image projection even when the person or the object is close to the screen 10 to some extent, for example, in a presentation or a class in a classroom. However, when the outer light OL is directly reflected, that is, regularly reflected, and if a component of the outer light lands on the eye of the speaker, the aspect of use described above is unavailable. On the other hand, in the present embodiment, control of the outer light can be realized, for example, when a presentation is performed using the projection system 100, the presenter can approach the screen 10 without having to worry about the regular reflection of the outer light OL.

As described above, in the screen 10 according to the present embodiment, the first angle region ω that determines the diffusion distribution of the reflected light RL in the control direction D1 in which light diffusion control is performed in the light control layer 3 is different according to a position on the screen 10. Accordingly, a projection image can be observed while maintaining brightness of the image and the observation distance L can be adjusted to be short, for example, with a diffusion emission direction of the image light corresponding to an assumed observer position while maintaining the size of the diffused angle range of 30° unchanged, by adjusting the diffusion distribution of the image light emitted from the surface of the screen 10 according to the position on the screen 10 to be tilted downward by the upper end UE side and tilted upward by the lower end BE side.

Further, for example, FIG. 2 shows that the center CF and the intersection SX are spaced on the center axis LX. This distance is equivalent to a margin for supporting an environment in which the projector 50 is installed as in FIG. 1, and allows a certain range. However, if the distance is allowed to be zero, that is, if the center CF is allowed to match the intersection SX, such an arrangement may be used. In this case, a relationship between the incidence angle ξ of the incident light PL and the inclination angle α of each light reflection layer 2 of the screen 10 can be optimized, and the incident light PL can be more reliably returned back to the front side in which the observer EY is present, that is, to the approximately +Z side.

Further, in the light reflection layer 2, a distribution, in the screen 10, of the inclinations of the respective reflection surfaces PS of the plurality of light reflection portions PP may be adjusted by appropriately adjusting a radius of curvature of the plurality of prism portions 2a arranged along the arc shape as necessary. In general, the periphery of the screen is more susceptible to an influence of aberration of the Fresnel prism reflection surface. For this reason, an angle deviation of the angle γ is easily generated in the periphery side of the screen 10. However, this deviation can be corrected by adjusting the radius of curvature.

Further, although not described in detail, even when the projector 50 is placed on an indoor floor and the proximity projection is performed from a bottom, the projection system 100 may have the same configuration.

Further, a surface of the light reflection portion PP is the reflection surface PS that reflects a light. The inclination angle α of the first inclined surface S1 with respect to the main surface 1a determines an inclination of the light reflection portion PP, that is, an inclination of the reflection surface PS. That is, in the prism portions 2a arranged in the concentric arc shape, the inclination angle α depends on the incidence angle ξ of the incident light PL, and the incident light PL incident on the reflection surface PS of one prism portion 2a formed in the arc shape has substantially the same incidence angle ξ. Since the inclination angle α is set according to a structure of the light control layer 3, as well as the incidence angle ξ, the incident light PL incident on the prism portion 2a is reliably turned back to the approximately +Z side without being extremely tilted in the ±X direction even in incidence on the center side of the screen 10, as well as the periphery side v. The same applies to all the prism portions 2a. That is, all the incident lights PL can be reliably turned back to the approximately +Z side by the reflection surfaces PS of the respective prism portions 2a.

Second Embodiment

Hereinafter, a screen according to a second embodiment will be described with reference to FIG. 9. Further, since a projection system 200 according to the present embodiment is a modified example of the projection system 100 of the first embodiment, a detailed description of the overall system is omitted. Further, parts having the same reference numerals as those in the first embodiment are the same as those in the first embodiment, unless mentioned otherwise.

Figure 9:
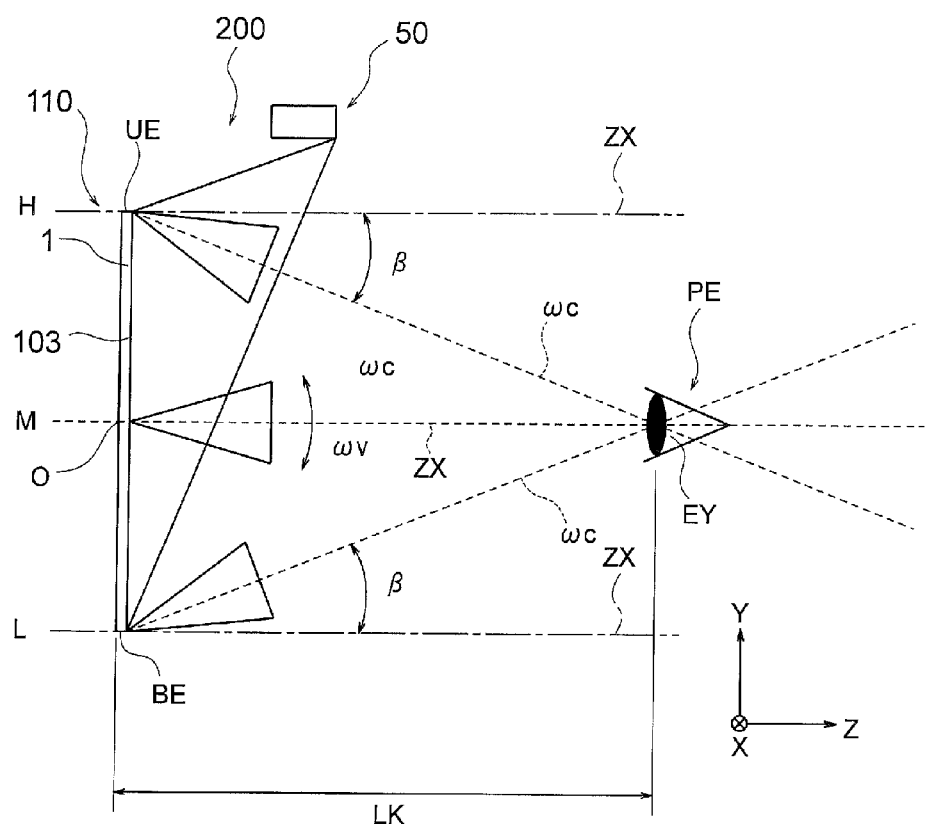
FIG. 9 is a view illustrating a screen according to a second embodiment.

As shown in FIG. 9, in a screen 110 that is a modified example of the screen 10, a light control layer 103 limits a first angle region ωv indicating an angle range in which a light is diffused to have a narrower range. That is, in the example of the first embodiment, the example of the size of the first angle region ωv is about 30° in order to secure the diffusion range to some extent while, in the present embodiment, the size may be smaller. Further, as shown in FIG. 9, in the first angle regions ωv having a different inclination according to respective positions in a control direction D1, diffusion center axes ωc that are centers of the first angle regions ωv are directed to be narrow toward a +Z direction that is an emission direction, that is, at an end side of an emission direction. All the diffusion center axes ωc intersect at a point in a position of an eye EY of the observer PE. In the shown case, the eye EY is assumed to be on a line extending in a normal direction, that is, the +Z direction from a center O of the screen 110, and to be in a position at the distance LK from the screen 110, and the size of the first angle region ωv of the light control layer 103 or the direction of the diffusion center axis ωc is correspondingly set. Specifically, in a position M that is a center in the Y direction, the center axis ωc is along the normal ZX while, in a position H on the +Y side and a position L on the −Y side, the center axis ωc is tilted downward in the position H and upward in the position L with a size of the same inclination angle β from the normal ZX. That is, the center axis can be adjusted according to the position of the eye EY of the observer PE. In this case, an image light can be narrowly emitted to the assumed specific position of the eye EY of the observer PE.

In the case of the present embodiment, as the diffusion range of the first angle region ωv is narrower, an image can be provided to only the observer PE that is a target, and can be invisible to persons other than the observer PE that is the target. Further, in this case, as the diffusion range is narrow, it is easy to provide a bright image or it is possible to obtain sufficient brightness with a relatively small light source.

Third Embodiment

Hereinafter, a screen according to a third embodiment will be described with reference to FIG. 10. Further, since a projection system 300 according to the present embodiment is a modified example of the projection system 100 of the first embodiment, a detailed description of the overall system is omitted. Further, parts having the same reference numerals as those in the first embodiment are the same as those in the first embodiment, unless mentioned otherwise.

Figure 10:
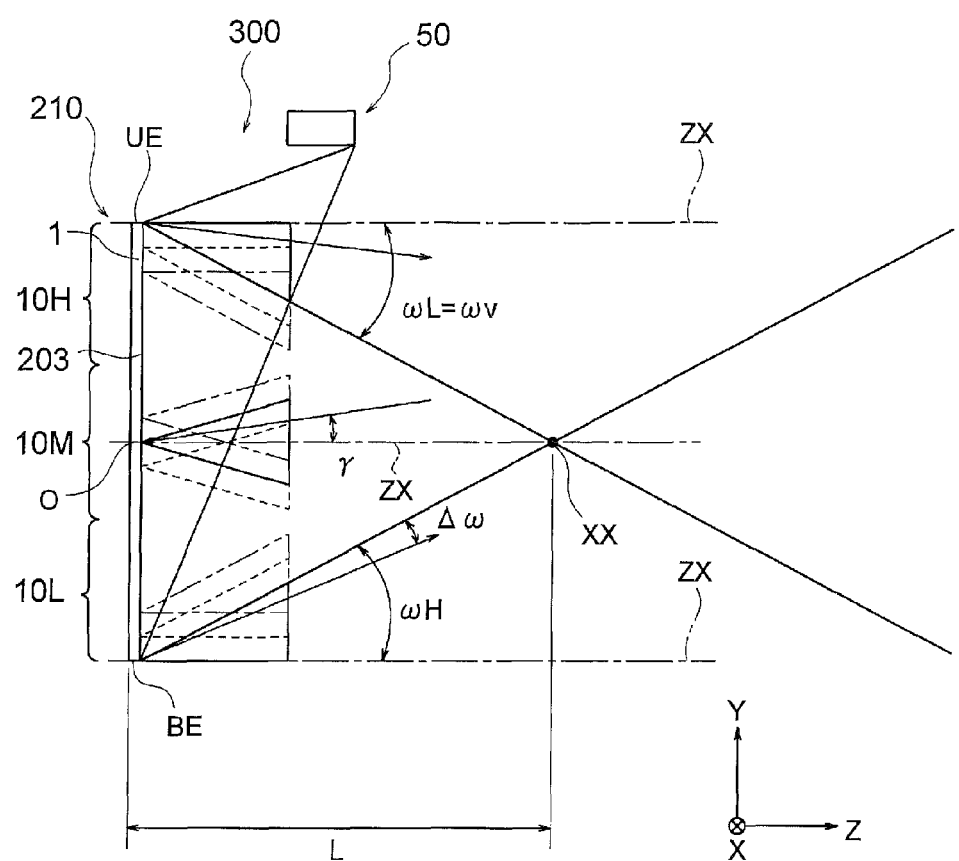
FIG. 10 is a view illustrating a screen according to a third embodiment.

As shown in FIG. 10, in a screen 210 that is a modified example of the screen 10, a light control layer 203 includes three partial areas 10H, 10M, and 10L divided on a +Y side, a center side and a −Y side according to a position of the screen 10 in a control direction D1. In the respective partial areas 10H, 10M, and 10L, first angle regions ωv are not changed and aligned in a constant direction, but the directions of the first angle regions ωv are different among the partial areas 10H, 10M, and 10L. Specifically, first, in the partial area 10M located on a center side, a critical angle ωH that is a region of an elevation angle in the first angle region ωv and a critical angle ωL that is a region of a depression angle are both 15° and the first angle region ωv is equally divided. On the other hand, in the partial area 10H located on the +Y side, the critical angle ωL in the first angle region ωv is 30° and the critical angle ωH is 0°. That is, the first angle region ωv is tilted to be the same as the critical angle ωL. On the other hand, in the partial area 10L located on the −Y side, the critical angle ωL in the first angle region ωv is 0° and the critical angle ωH is 30°. That is, the first angle region ωv is tilted to be the same as the critical angle ωH.

In the case of the present embodiment, as the light control layer 203 includes the plurality of partial areas 10H, 10M, and 10L, the first angle region ωv can be changed stepwise. Accordingly, an observation distance L for observation can be short while maintaining brightness of an image.

Further, in the above description, for example, the light control layer 203 includes the three divided partial areas, but the number of divided areas is not limited to three and, for example, the light control layer 203 may include more partial areas. Further, the light control layer 203 is not limited to division in a vertical direction, that is, the Y direction, and the light control layer 203 may be divided in a horizontal direction, that is, in the +X direction.

Fourth Embodiment

Hereinafter, a screen according to a fourth embodiment will be described with reference to FIG. 11. Further, since a projection system according to the present embodiment is a modified example of the projection system 100 of the first embodiment, only a structure of the screen will be described and the overall system is not shown.

Figure 11:
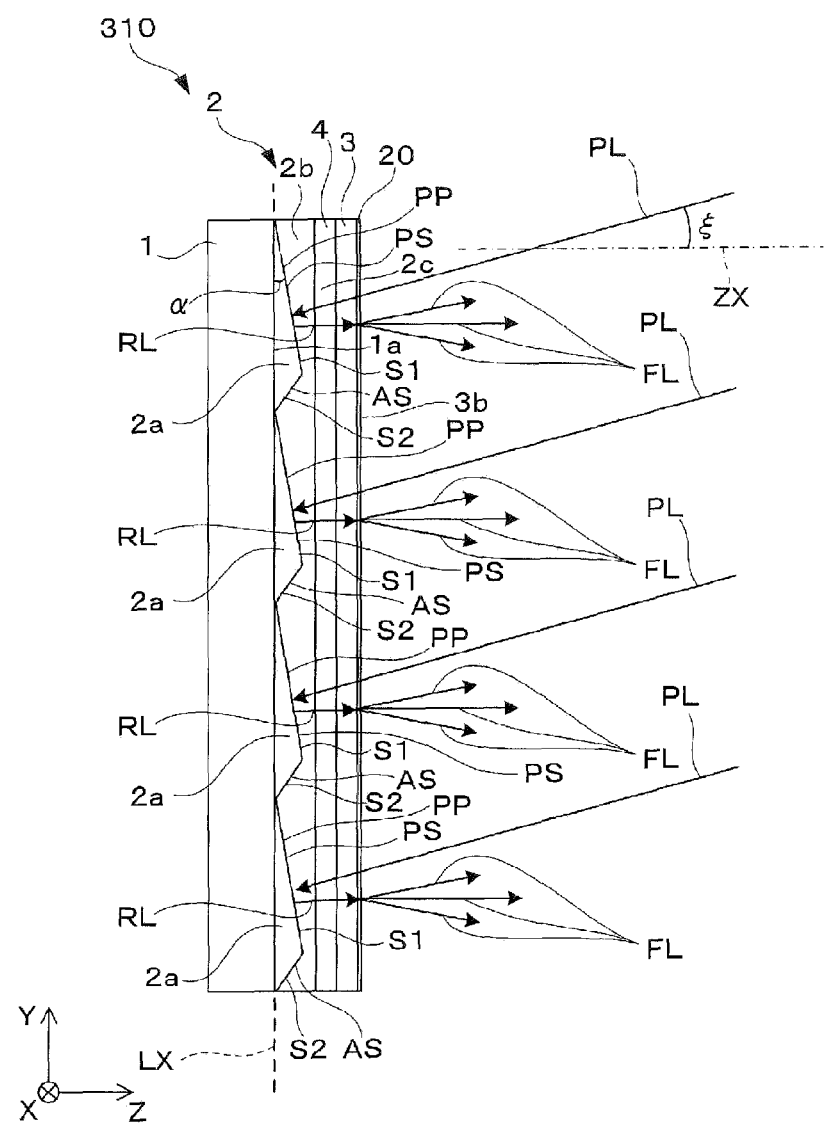
FIG. 11 is a cross-sectional view illustrating a screen according to a fourth embodiment

As shown in FIG. 11, a screen 310 that is a modified example of the screen 10 further includes a second light control layer 4 having the same structure as the light control layer 3, between a light reflection layer 2 and a light control layer 3. However, the second light control layer 4 differs from the light control layer 3 in that it exhibits incidence angle selectivity for an inclination of the X direction with respect to a normal direction of a main surface 1a, that is, the X direction is a control direction. Accordingly, the screen 210 can more widely diffuse a light in the X direction, that is, the horizontal direction.

In addition, a light diffusion layer having a characteristic of diffusion of light in the X direction without exhibiting the incidence angle selectivity, that is, irrespective of the incidence angle, may be used as the second light control layer 4.

(Others)

While the present invention has been described above in connection with the respective embodiments, the present invention is not limited to the above embodiment and may be embodied in various aspects without departing from the scope and spirit of the present invention. For example, the following modified examples are possible.

While, in the above description, the light control layer 3 has the incidence angle selectivity in that the light control layer 3 drastically changes the transmission into either the diffusion-transmission or the straight transmission, the light control layer 3 may be a light diffusion layer having a characteristic of light diffusion in the X direction without exhibiting the incidence angle selectivity, that is, irrespective of the incidence angle. As the light control layer 3, for example, a layer having a nature of diffusing a light according to a normal distribution, with an emission direction of the reflected light RL being a reference, may be used. In this case, a diffusion-transmission change is smooth as compared to the layer having the incidence angle selectivity.

Further, in the above description, as the image lights proceed in the +Z direction as a whole, the image lights are emitted to converge on the normal ZX extending from the center O of the screen 10, for example, as indicated by the diffusion center axes ωc in FIG. 9. However, conversely, the first angle region ω may be adjusted so that the light is away from the normal ZX and spreads to the periphery. Further, the first angle region ω may be adjusted to converge in a direction or a position other than the normal ZX extending from the center O of the screen 10. For example, when the screen is located on an upper side and the observer looks up at the screen, the first angle region ω may be changed to be biased downward as a whole.

Further, while, in the above description, the plurality of prism portions 2a in the light reflection layer 2 have the Fresnel shape in which the prism portions 2a are arranged in the concentric arc shape without a gap, the arrangement or the shape of the plurality of prism portions 2a is not limited thereto as long as the incident light PL is reliably turned back to the front side. For example, the prism portions 2a may be arranged in parallel along an elliptical curve rather than the concentric arc.

Further, each prism portion 2a may have a shape other than an annular shape. For example, a plurality of block-shaped prisms may be arranged along a curve in a concentric arc shape to function as one prism portion.

Further, while, in the above description, the plurality of prism portions 2a are, for example, in the concentric arc shape as the Fresnel shape, this results from the fact that the projection system 100 performs the proximity projection and there is a great difference in the incidence angle between the center and the periphery in the X direction. Accordingly, when the projection system 100 performs non-proximity projection, each prism portion 2a may have a linear shape (a bar shape).

Further, while, in the above description, the direction in which the incident light PL is to be turned back is on the front side or the approximately front side since the observer is assumed to be present on the front side or the approximately front side, the direction in which the incident light PL is to be turned back may be appropriately changed when the observer is in a position other than the front side.

Further, while, in the above description, the second light control layer 4 is provided between the light reflection layer 2 and the light control layer 3 in the screen 310 of the fourth embodiment shown in FIG. 11, the light control layer 3 and the second light control layer 4 may be replaced.

Although the first to third embodiments of the present invention have been described hitherto in detail with reference to the drawings, specific configurations are not limited to the embodiments, and the present invention also includes various designs without departing from the scope of the present invention.

While preferred embodiments of the present invention have been described and illustrated above, it should be understood that these are exemplary of the present invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

The invention claimed is:

1. A screen comprising:
   a substrate;
   a light reflection layer including a plurality of prism portions formed to be arranged on a main surface of the substrate and having a sectional serrulate shape in an arrangement direction, and a plurality of light reflection portions formed in surface portions of the plurality of prism portions, for reflecting an incident light; and
   a light control layer formed on a surface of the light reflection layer, and in a function section that includes a predetermined control direction among directions parallel to the main surface of the substrate and is perpendicular to the main surface of the substrate, the light control layer allowing a light incident to pass on the light reflection layer and allowing a reflected light to diffuse from the light reflection layer,
   wherein the light control layer diffuses the reflected light so that a diffusion distribution of the reflected light differs according to a position in the predetermined control direction on the main surface of the substrate.

2. The screen according to claim 1, wherein
   the light control layer exhibits, in the function section corresponding to the predetermined control direction, a diffusion characteristic that diffuses the reflected light at a larger angle than the other section corresponding to the other direction, and
   the light control layer diffuses and transmits a light incident from a first angle region in which an inclination with respect to the main surface of the substrate is within a predetermined range, and straightly transmits a light incident from a second angle region outside the predetermined range.

3. The screen according to claim 2, wherein
   the light control layer allows the first angle region to be continuously changed according to the position in the predetermined control direction on the main surface of the substrate.

4. The screen according to claim 3, wherein
   the light control layer allows the first angle region to be changed so that a diffusion center axis that are centers of the first angle region in the function section corresponding to the predetermined control direction are directed to be narrow at an end side of an emission direction.

5. The screen according to claim 2, wherein
   the light control layer is configured in a plurality of partial areas divided according to the position in the predetermined control direction on the main surface of the substrate, has the first angle region that is the same in each partial area and different between partial areas, and allows the first angle region to be gradually changed.

6. The screen according to claim 5, wherein
   the light control layer allows the first angle region to be changed so that a diffusion center axis that are centers of the first angle region in the function section corresponding to the predetermined control direction are directed to be narrow at an end side of an emission direction.

7. The screen according to claim 2, wherein
   the light control layer allows the first angle region to be changed so that a diffusion center axis that are centers of the first angle region in the function section corresponding to the predetermined control direction are directed to be narrow at an end side of an emission direction.

8. The screen according to claim 7, wherein the light control layer changes the first angle region so that the diffusion center axis intersects at one point.

9. The screen according to claim 2, wherein, in the light control layer, the predetermined control direction is parallel to a reference direction obtained by orthogonally projecting an optical path direction of a reference light that is a center light beam of an incident light to the main surface of the substrate.

10. The screen according to claim 9, wherein
    the inclination of the light reflection portion with respect to a screen normal close to an image projection apparatus for projecting a projection image to the screen is larger than the inclination of the light reflection portion distant from the image projection apparatus.

11. The screen according to claim 2, wherein
in the light control layer, the predetermined control direction is a perpendicular direction to a longitudinal direction of the substrate.

12. The screen according to claim 11, wherein
an inclination of the light reflection portion with respect to a screen normal is different according to the position in the predetermined control direction on the main surface of the substrate.

13. The screen according to claim 12, wherein
the inclination of the light reflection portion with respect to a screen normal close to an image projection apparatus for projecting a projection image to the screen is larger than the inclination of the light reflection portion distant from the image projection apparatus.

14. The screen according to claim 1, wherein
in the light control layer, the predetermined control direction is parallel to a reference direction obtained by orthogonally projecting an optical path direction of a reference light that is a center light beam of an incident light to the main surface of the substrate.

15. The screen according to claim 1, wherein
in the light control layer, the predetermined control direction is a perpendicular direction to a longitudinal direction of the substrate.

16. The screen according to claim 15, wherein
an inclination of the light reflection portion with respect to a screen normal is different according to the position in the predetermined control direction on the main surface of the substrate.

17. The screen according to claim 16, wherein
the inclination of the light reflection portion with respect to a screen normal close to an image projection apparatus for projecting a projection image to the screen is larger than the inclination of the light reflection portion distant from the image projection apparatus.

18. The screen according to claim 1, wherein
an inclination of the light reflection portion with respect to a screen normal is different according to the position in the predetermined control direction on the main surface of the substrate.

19. The screen according to claim 1, wherein
the diffusion distribution is configured such that an upper image in the control direction is diffused downward and a lower image in the control direction is diffused upward.

20. A projection system comprising:
a screen including:
a substrate,
a light reflection layer including a plurality of prism portions formed to be arranged on a main surface of the substrate and having a sectional serrulate shape in an arrangement direction, and a plurality of light reflection portions formed in surface portions of the plurality of prism portions, for reflecting an incident light, and
a light control layer formed on a surface of the light reflection layer, and in a function section that includes a predetermined control direction among directions parallel to the main surface of the substrate and is perpendicular to the main surface of the substrate, the light control layer allowing a light incident to pass on the light reflection layer and allowing a reflected light to diffuse from the light reflection layer, wherein the light control layer diffuses the reflected light so that a diffusion distribution of the reflected light differs according to a position in the predetermined control direction on the main surface of the substrate; and
an image projection apparatus for projecting an incident light that is a projection image to the screen in a predetermined angle range.

21. The projection system according to claim 20, wherein
the diffusion distribution is configured such that an upper image in the control direction is diffused downward and a lower image in the control direction is diffused upward.

* * * * *